United States Patent
Maeshiba

(10) Patent No.: US 9,903,363 B2
(45) Date of Patent: Feb. 27, 2018

(54) STRUCTURE FOR PREVENTING SUBMERSION OF DEVICE

(71) Applicant: SHOWA KIKI KOGYO CO., LTD., Fukuoka (JP)

(72) Inventor: Shinsuke Maeshiba, Fukuoka (JP)

(73) Assignee: SHOWA KIKI KOGYO CO., LTD., Fukuoka (JP)

( * ) Notice: Subject to any disclaimer, the term of this patent is extended or adjusted under 35 U.S.C. 154(b) by 368 days.

(21) Appl. No.: 14/409,539

(22) PCT Filed: Jun. 17, 2013

(86) PCT No.: PCT/JP2013/066587
§ 371 (c)(1),
(2) Date: Dec. 19, 2014

(87) PCT Pub. No.: WO2014/024566
PCT Pub. Date: Feb. 13, 2014

(65) Prior Publication Data
US 2015/0322941 A1    Nov. 12, 2015

(30) Foreign Application Priority Data

Aug. 10, 2012 (JP) .................. 2012-178624

(51) Int. Cl.
*F04B 53/00* (2006.01)
*E04H 9/14* (2006.01)
(Continued)

(52) U.S. Cl.
CPC ............ *F04B 53/00* (2013.01); *E04H 9/145* (2013.01); *F04B 23/02* (2013.01); *F04B 23/021* (2013.01); *F04D 29/601* (2013.01); *F04D 29/606* (2013.01)

(58) Field of Classification Search
CPC ..................................................... E04H 9/145
See application file for complete search history.

(56) References Cited

U.S. PATENT DOCUMENTS 4,087,980 A * 5/1978 Kono .................... B63C 11/44
 114/257
4,626,128 A * 12/1986 Devine ................. B63C 11/44
 114/221 R
(Continued)

FOREIGN PATENT DOCUMENTS

JP  2001304163       10/2001
JP  2001304163 A  * 10/2001
(Continued)

OTHER PUBLICATIONS

Written Opinion of the International Searching Authority dated Feb. 10, 2015 for PCT/JP2013/066587 filed Jun. 17, 2013.
(Continued)

*Primary Examiner* — Benjamin F Fiorello
(74) *Attorney, Agent, or Firm* — Paul D. Bianco; Gary S. Winer; Fleit Gibbons Gutman Bongini & Bianco PL

(57) ABSTRACT

Provided is a device submersion preventing structure which is capable of releasing heat generated from a device such as a pump and oil vapor, and preventing submersion of the device. The device submersion preventing structure comprises an enclosure having an internal chamber 60 for installing a pump 20 therein, wherein the enclosure 60 is configured such that an opening 61 is provided only in a bottom portion thereof, and a remaining portion thereof is formed as an air-confining structure.

4 Claims, 13 Drawing Sheets

(51) Int. Cl.
    *F04D 29/60*      (2006.01)
    *F04B 23/02*      (2006.01)

(56)         References Cited

U.S. PATENT DOCUMENTS 5,049,004   A  *   9/1991   Niimura .................. E02D 29/06
                                                            405/194
    6,425,707   B1 *   7/2002   Baxter .................... E04H 9/145
                                                            405/104
    6,457,907   B1 * 10/2002    De Bloeme ............ B63C 11/44
                                                            114/314
    7,513,385   B2 *   4/2009   Flynn ........................ H02G 9/10
                                                            220/484
 2009/0084704  A1 *   4/2009   Fogerlie .................. H02G 9/10
                                                            206/703

FOREIGN PATENT DOCUMENTS

JP         2002354630        12/2002
    JP         2002354630  A  *  12/2002

OTHER PUBLICATIONS

International Preliminary Report on Patentability dated Feb. 10, 2015 for PCT/JP2013/066587 filed Jun. 17, 2013.
International Search report dated Jul. 24, 2013 for PCT/JP2013/066587 filed Jun. 17, 2013.
English translation of International Search report dated Jul. 24, 2013 for PCT/JP2013/066587 filed Jun. 17, 2013.

* cited by examiner

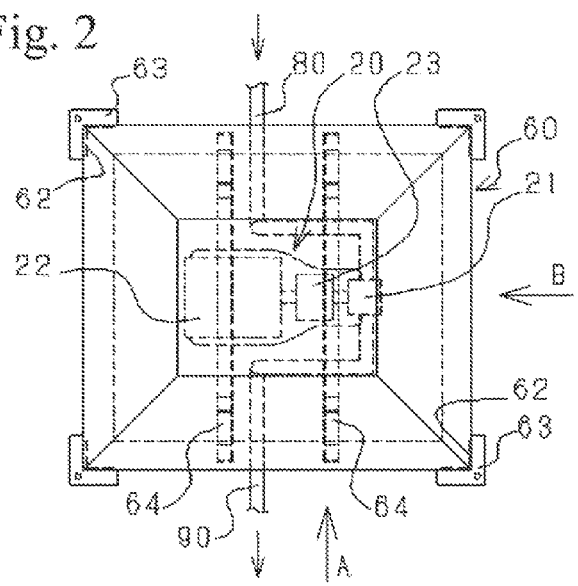
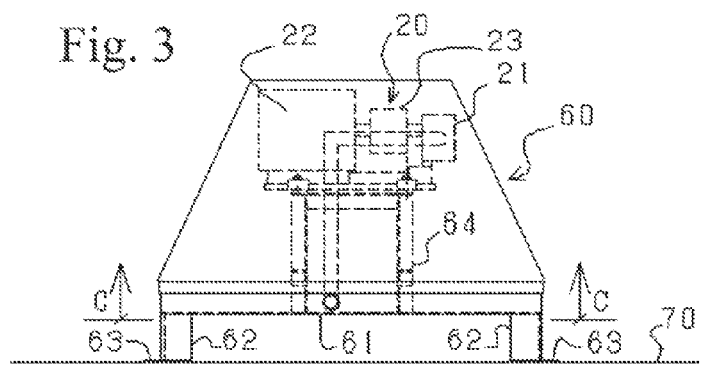
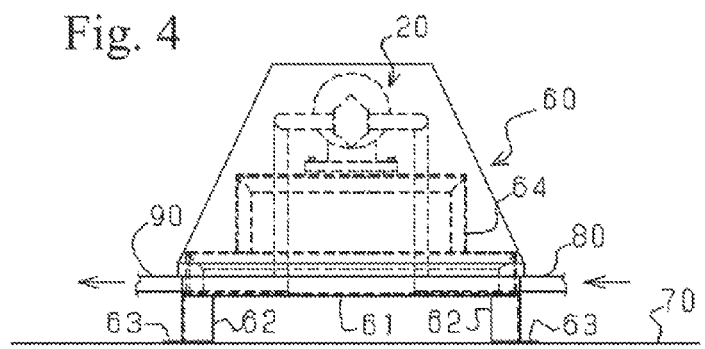

Fig. 8
(a) 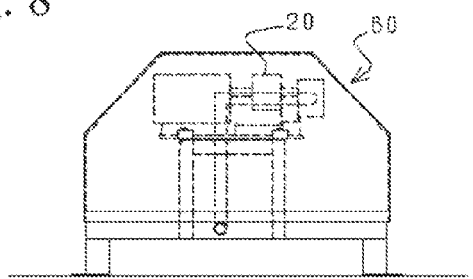
(b) 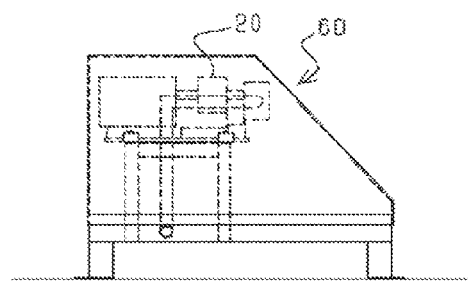
(c) 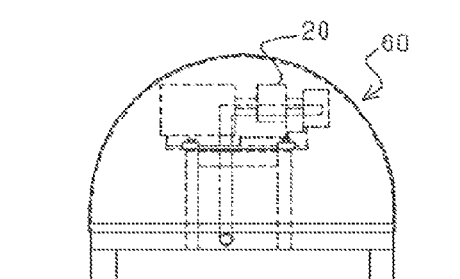
(d) 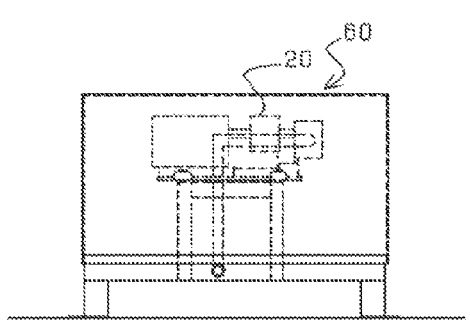
(e) 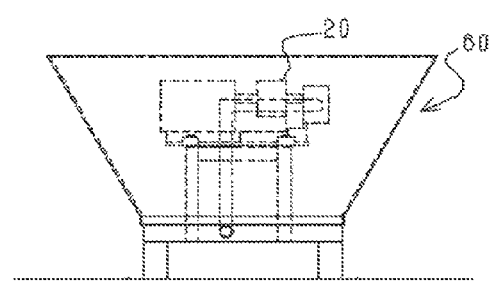

Fig. 18
(a)
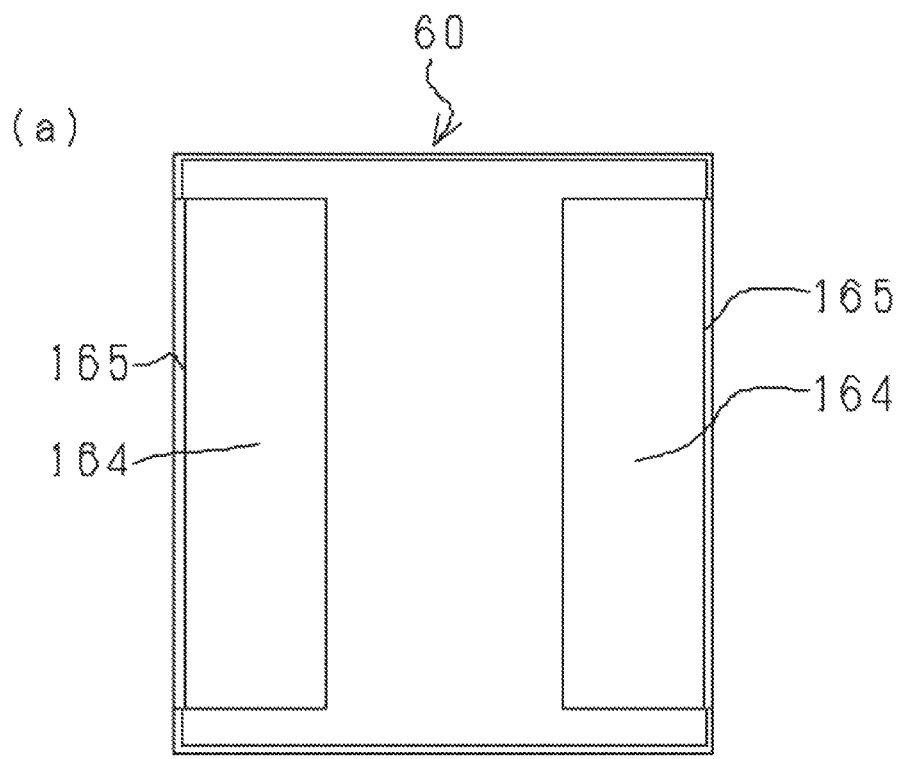
(b)
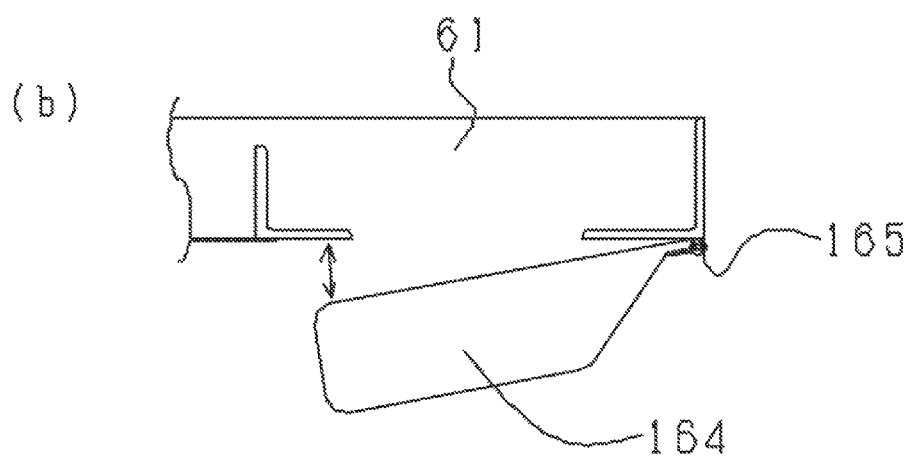

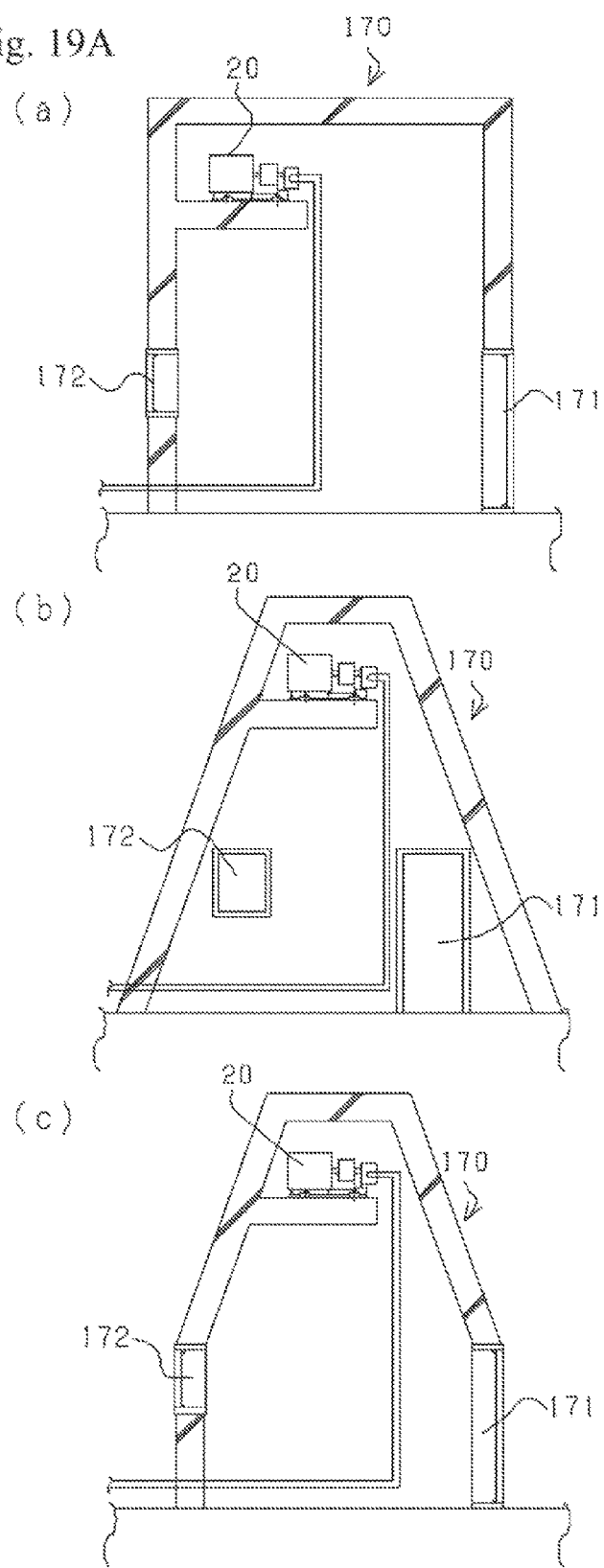

Fig. 19B
(a)
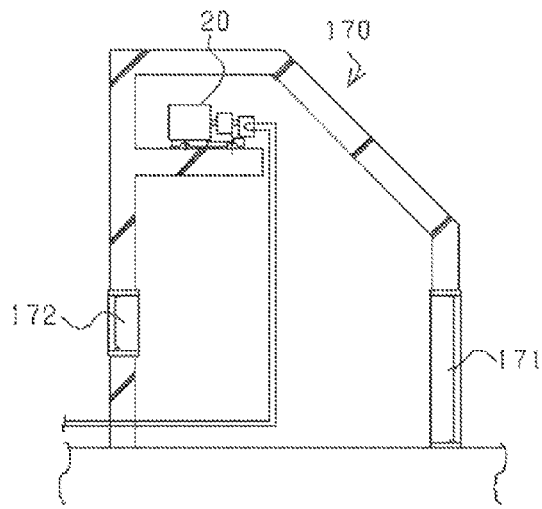
(b)
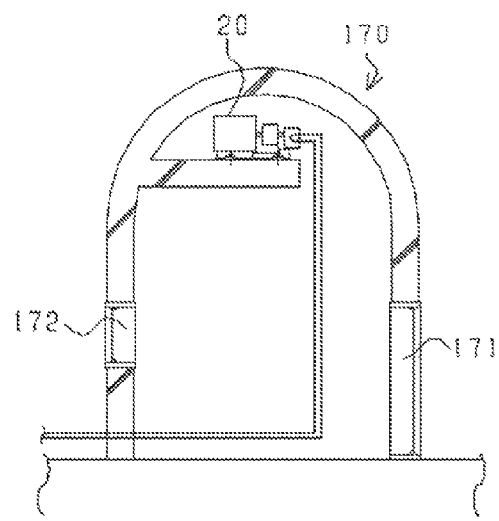
(c)
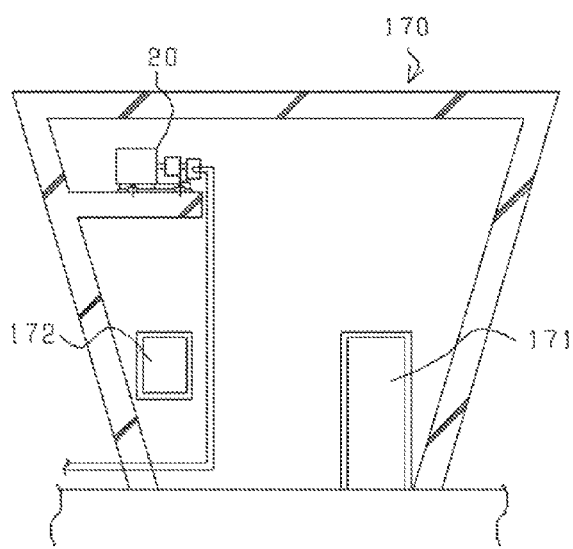

STRUCTURE FOR PREVENTING SUBMERSION OF DEVICE

TECHNICAL FIELD

The present invention relates to a device submersion preventing structure, specifically, a structure for, in the event of tsunami, floods or the like, preventing a device such as a pump from being submerged in water.

BACKGROUND ART

For example, as for a pump for feeding oil stored in an underground tank to a private power generator, it is often installed on a ground surface (GL) close to the underground tank, in relation to a suction head of the pump, and generally no measure against submersion was taken. However, after the Great East Japan Earthquake, measures for preventing submersion of a pump have become considered to be important, and various pump submersion prevention measures are currently being studied and taken.

Heretofore, as a pump submersion prevention measure, there has been known a structure configured to install a pump in a watertight box or enclosure (watertight structural member), as disclosed in the following Patent Document 1. There has also been known a technique of using as a pump an oil-submersible pump and installing the pump under oil stored in an underground tank.

However, a pump submersion preventing structure using the watertight enclosure of the Patent Document 1 is based on completely covering a pump by the watertight enclosure. Thus, during use in a normal state, heat generated from the pump stays within the watertight enclosure, so the heat is likely to cause a malfunction or failure of the pump, particularly, when the pump is continuously used for a long period of time. Moreover, in the case where the pump is an oil feed pump, oil vapor stays within the watertight enclosure, and thus leads to a situation where explosion or the like is extremely highly likely to occur.

On the other hand, in the case of using an oil-submersible pump (water-submersible pump), the oil-submersible pump (water-submersible pump) is much more expensive than a commonly-used pump, and is required to take a considerable amount of cost, time and effort, specifically, required to be extracted from an inside of the underground tank during maintenance in the event of a malfunction or failure of the pump.

It is to be understood that such a submersion preventing measure is required for any device, such as an electric or electronic device and its peripherals (e.g., console), a mechanical device and a nuclear-related device, as well as a pump.

CITATION LIST

Patent Document

Patent Document 1: JP 2001-304163 A

SUMMARY OF INVENTION

Technical Problem

The present invention addresses a technical problem of providing a device submersion preventing structure capable of preventing submersion of any device, such as an electric or electronic device and its peripherals (e.g., console), a mechanical device and a nuclear-related device, and releasing heat generated from the device and oil vapor.

Solution to Technical Problem

According to one aspect of the present invention, there is provided a device submersion preventing structure which comprises an enclosure having an internal chamber for installing a device therein, wherein the enclosure is configured such that an opening is provided only in a bottom portion thereof, and a remaining portion thereof is formed as an air-confining structure.

As above, the device submersion preventing structure of the present invention employs the enclosure having an opening. Thus, heat generated from the device and oil vapor can be released from the opening. In addition, the opening is provided only in the bottom portion of the enclosure. Thus, even in a situation where the enclosure is submerged in water and water enters from the opening into the enclosure, water is never fully filled in an internal chamber of the enclosure, so that it becomes possible to prevent the device installed in the enclosure from being submerged in water.

According to another aspect of the present invention, there is provided a device submersion preventing structure which comprises an enclosure having an internal chamber for installing a device therein, wherein the enclosure is configured such that an opening is provided only in a bottom portion thereof, or only in a lateral portion thereof at a position below an installation position of the device, and a remaining portion thereof is formed as an air-confining structure.

In view of preventing submersion of the device, it is preferable to provide the opening only in the bottom portion. However, air confined within the enclosure in a region where the device is installed (device installation region) can prevent water from being filled in the device installation region, i.e., can prevent submersion of the device.

The device submersion preventing structure of the present invention is also capable of releasing oil vapor from the opening of the enclosure, in the same manner as mentioned above, so that it is particularly suitably usable for an oil feed pump having a problem with staying of oil vapor. It is to be understood that the device submersion preventing structure of the present invention can also be applied to any device, such as any type of pump other than the oil feed pump, an electric or electronic device and its peripherals (e.g., console), a mechanical device and a nuclear-related device.

Preferably, in the device submersion preventing structure of the present invention, the enclosure is formed such that a region of an internal chamber thereof where the device is installed is gradually narrowed in an upward direction. According to this feature, when water enters from the opening into the enclosure, it becomes possible to ensure a relatively large height dimension of a confined air space formed in an upper region of the internal chamber of the enclosure.

The device submersion preventing structure of the present invention may further comprise a blocking member disposed beneath the opening of the enclosure movably in an up-down direction, wherein the blocking member may be configured such that, in a normal state, it is disposed to open the opening of the enclosure, and, in the event of flooding, moved upwardly to block up the opening of the enclosure. According to this feature, it becomes possible to more reliably prevent submersion of the device. The blocking member may be moved by a drive mechanism such as an electric or pneumatic drive mechanism.

In the above device submersion preventing structure, the blocking member may be composed of a float member floatable on water. In this case, the float member is configured such that, in a normal state, it is disposed to open the opening of the enclosure, and, in the event of flooding, moved upwardly by a buoyancy of water to block up the opening of the enclosure. This makes it possible to eliminate a need for a drive mechanism for moving the blocking member upwardly, and facilitate structural simplification.

The device submersion preventing structure of the present invention may further comprise a water flow resisting member disposed around the opening to reduce a force of water entering from the opening. According to this feature, even in a situation where water enters from the opening into the enclosure, a force of the water is reduced by the water flow resisting member, so that it becomes possible to prevent the water from violently ruffling in the enclosure, thereby preventing the water from being splashed over the device. In the above structure, in the case where the water flow resisting member is disposed around the opening of the bottom portion of the enclosure, the water flow resisting member may be composed of a float member floatable on water. In this case, the float member may be configured such that, in a normal state, it is disposed to open the opening of the bottom portion, and, in the event of flooding, moved by a buoyancy of water in an upward direction for blocking the opening of the bottom portion. Specifically, the float member may be configured to be devoid of a sealing element such as a packing so as not to completely block up the opening, thereby reducing a force of water entering from the opening Effect of Invention The present invention achieves the following advantageous effects.

(1) The enclosure is provided with an opening, and thereby the internal chamber of the enclosure always communicates with an external air, so that it becomes possible to release heat generated from the device and oil vapor. Thus, it becomes possible to prevent the occurrence of malfunction or failure of the device due to the heat. It also becomes possible to prevent the occurrence of explosion due to the oil vapor, thereby providing an extremely-safe state.

(2) The opening is provided only in the bottom portion of the enclosure, or only in the lateral portion of the enclosure at a position below the installation position of the device. Thus, even in a situation where the enclosure is submerged in water, a confined air space is formed in the internal chamber of the enclosure. Thus, submersion of the device can be prevented by installing the device in an area where the confined air space is to be formed. Therefore, even in the event of tsunami or flooding, it becomes possible to avoid a situation where the device becomes unusable, so that the operation of the device can be continued. This makes it possible to prevent damage from spreading to thereby allow rapid disaster recovery.

(3) Measures against a disaster such as tsunami or flooding can be taken by a commonly-used inexpensive device, and work such as maintenance in the event of a malfunction or failure of the pump can be performed with good efficiency, so that it becomes possible toe a device submersion preventing structure having excellent economic efficiency and convenience.

BRIEF DESCRIPTION OF DRAWINGS

FIG. 2 is a top plan view illustrating a device submersion preventing structure according a first embodiment of the present invention, wherein the device submersion preventing structure is applied to a pump in the system illustrated in FIG. 1.

FIG. 3 is a view of the device submersion preventing structure when viewed in a direction indicated by the arrowed line A in FIG. 2.

FIG. 4 is a view of the device submersion preventing structure when viewed in a direction indicated by the arrowed line B in FIG. 2.

FIG. 8 illustrates various modifications of a shape of the enclosure.

FIG. 16 illustrated a device submersion preventing structure according still another embodiment of the present invention, wherein the device submersion preventing structure is applied to the pump in the system illustrated in FIG. 1, and wherein FIG. 16(a) is a bottom view, and FIG. 16(b) is a fragmentary vertical sectional view.

FIG. 18 illustrates another modification of the water flow resisting member.

FIG. 19A illustrates examples of a device submersion preventing structure according yet still another embodiment of the present invention, wherein a structural member of a building is utilized as an enclosure of the device submersion preventing structure.

FIG. 19B illustrates examples of a modification of the device submersion preventing structure in FIG. 19A, wherein a structural member of a building is utilized as an enclosure of the device submersion preventing structure.

DESCRIPTION OF EMBODIMENTS

With reference to the drawings, the present invention will now be described based on various embodiments thereof. Each of the following embodiments is an example in which a device submersion preventing structure according to the present invention is applied to a pump for feeding oil stored in an underground tank to a private power generator.

Figure 1:
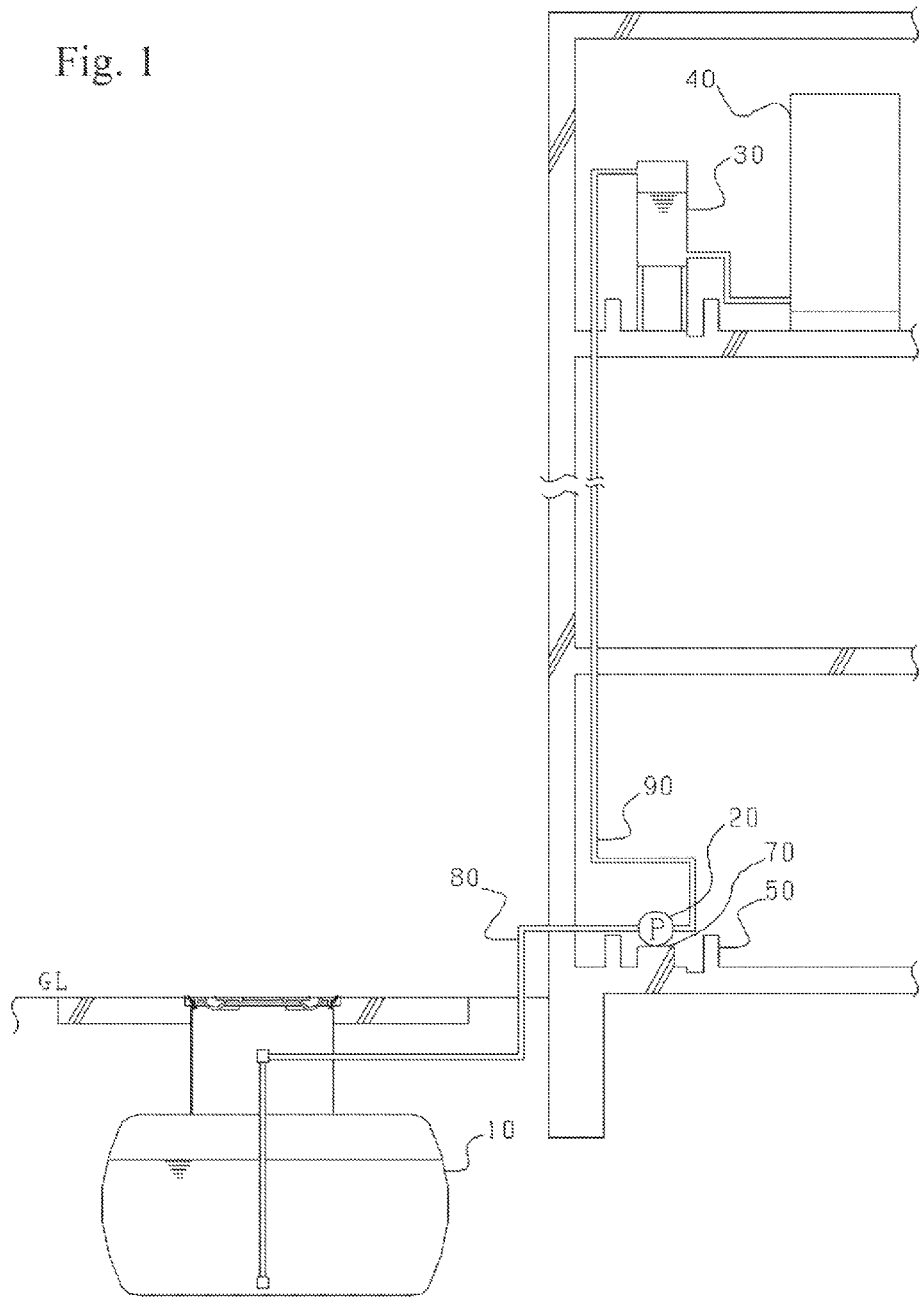
FIG. 1 illustrates an overall configuration of a private power-generating system employing the present invention.
Figure 5:
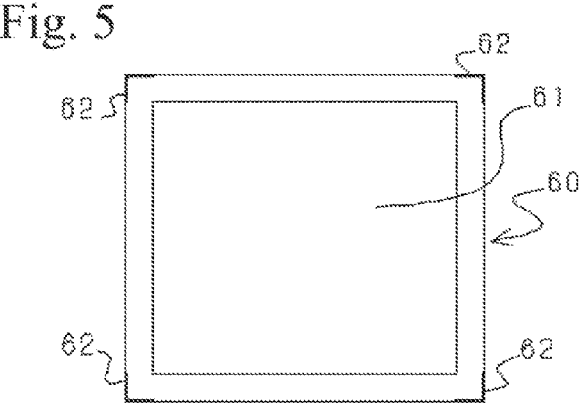
FIG. 5 is a sectional view taken along the line C-C in FIG. 3.

FIG. 1 illustrates an overall configuration of a private power-generating system employing the present invention. The private power-generating system illustrated in FIG. 1 is configured to feed oil stored in an underground tank 10 to a private power generator 40 via a service tank 30 by using a pump (oil feed pump) 20. The pump 20 is disposed inside an oil barrier dam 50.

First Embodiment

FIG. 2 is a top plan view illustrating a device submersion preventing structure according a first embodiment of the present invention, wherein the device submersion preventing structure is applied to a pump in FIG. 1, and FIG. 3, FIG. 4 and FIG. 5 are, respectively, a view of the device submersion preventing structure when viewed in a direction indicated by the arrowed line A in FIG. 2, a view of the device submersion preventing structure when viewed in a direction indicated by the arrowed line B in FIG. 2, and a sectional view taken along the line C-C in FIG. 3.

The pump 20 is installed in an enclosure 60. The enclosure 60 is formed in a four-sided truncated pyramid shape, and configured such that an opening 61 is provided only in a bottom portion thereof, and a remaining portion thereof is formed as an air-confining structure. This enclosure 60 is disposed above a base 70 provided inside the oil barrier dam 50 (see FIG. 1). More specifically, four legs 62 each formed of an equal angle steel are joined, respectively, to four corners of the bottom portion of the enclosure 60, and then four square-shaped support plates 63 are fixed, respectively, to distal (lower) ends of the legs 62, and further fixed to the base 70.

The pump 20 installed in the enclosure 60b comprises: a pump main unit 21; a motor 22 for driving the pump main unit 21; and a rotary section 23 including a shaft and a coupling connecting between the pump main unit 21 and the motor 22, wherein a suction pipe 80 leading from the underground tank 10 and a discharge pipe 90 leading to the service tank 30 each illustrated in FIG. 1 are connected to the pump main unit 21. Two portions of the enclosure 60 penetrated, respectively, by the suction pipe 80 and the discharge pipe 90 are water-tightly sealed.

The pump 20 is placed on a frame 64 provided to stand upwardly from a peripheral flange of the bottom portion of the enclosure 60 defining the opening 61, so that it is disposed in an upper region of an internal chamber of the enclosure 60. A height level of an installation position of the pump 20 is set such that the pump 20 is located in an area corresponding to a confined air space to be formed in the upper region of the internal chamber of the enclosure 60 when water enters from the opening 61 into the enclosure 60.

Figure 6:
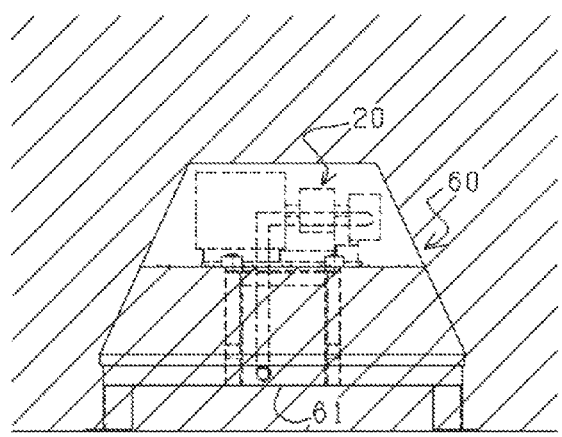
FIG. 6 is a front view of the device submersion preventing structure illustrated in FIG. 2, in a submerged state of an enclosure.

FIG. 6 illustrates a state in which the enclosure 60 is submerged in water, and water enters from the opening 61 into the enclosure 60. As illustrated in FIG. 6, even in a situation where the enclosure 60 is submerged in water and water enters from the opening 61 into the enclosure 60, air existing in the internal chamber of the enclosure 60 is confined therein to form a confined air space to thereby prevent the enclosure from being fully filled with water. Thus, as long as the pump 20 is located in the area corresponding to the confined air space, the pump 20 will never be submerged in water. A height dimension of the confined air space is determined by a submerged level of the enclosure 60 and a shape of the internal chamber of the enclosure 60. In this embodiment, the enclosure 60 is formed in a four-sided truncated pyramid shape, and configured such that the internal chamber thereof is gradually narrowed in an upward direction. Thus, it becomes possible to ensure a relatively large height dimension of the confined air space. The example illustrated in FIG. 6 is based on an assumption that the submerged level of the enclosure 60 is a water depth of 34 m, and a height level of the installation position of the pump 20 is set such that the pump 20 is located in an area corresponding to a confined air space to be formed at this submerged level.

In addition, in this embodiment, the enclosure 60 is formed in a four-sided truncated pyramid shape, so that it becomes possible to turn aside a force of a water flow such as tsunami by inclinations of outer lateral surfaces.

As above, in the first embodiment, even in a situation where the enclosure is submerged in water, it becomes possible to prevent the pump 20 in the enclosure 60 from being submerged in water to thereby continue the operation of the pump 20. In addition, the internal chamber of the enclosure 60 always communicates with an external air, so that it becomes possible to release heat generated from the pump 20 and oil vapor. In particular, oil vapor is heavier than air (atmospheric air), so that it can be efficiently released from the opening 61 of the bottom portion of the enclosure 60.

Figure 7:
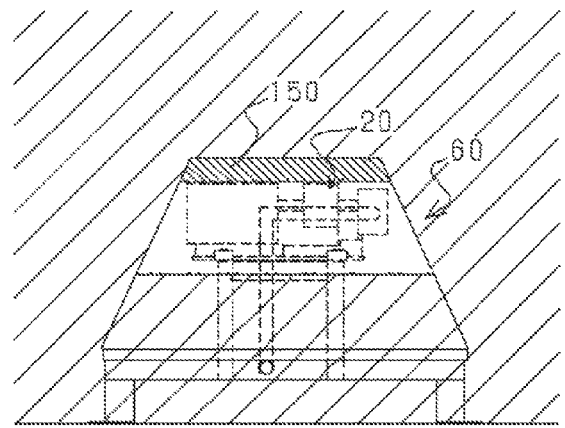
FIG. 7 illustrates a modification of the first embodiment in FIG. 2, wherein a filling material is disposed in a part of an area corresponding to a confined air space to be formed in an upper region of an internal chamber of the enclosure.

FIG. 7 illustrates a modification of the first embodiment, wherein a filling material 150 is disposed in apart of the area corresponding to the confined air space to be formed in the upper region of the internal chamber of the enclosure 60. More specifically, the filling material 150 is disposed between an upper surface of the pump 20 and a ceiling surface (inner surface of a top wall) of the enclosure 60. When the filling material 150 is disposed in an upper part of the area corresponding to the confined air space to be formed in the upper region of the internal chamber of the enclosure 60, a position of the area corresponding to the confined air space is shifted in a downward direction by a distance equivalent to a height dimension of the filling material 150, so that it becomes possible to lower a water level in the internal chamber of the enclosure.

FIG. 8 illustrates various modifications of a shape of the enclosure 60. In view of ensuring a relatively large height dimension of the confined air space, it is most preferable to allow the internal chamber of the enclosure 60 to become gradually narrow in the upward direction, as mentioned above. However, as long as the enclosure 60 is formed such that at least a region of the internal chamber thereof where the pump 20 is installed is gradually narrowed in the upward direction, as illustrated in FIG. 8(a), a relatively large height dimension of the confined air space can also be ensured. Further, as a shape of the internal chamber of the enclosure 60 which is gradually narrowed in the upward direction, it is possible to employ shapes illustrated in FIGS. 8(*a*) and 8(*b*) (8(*a*) to 8(*c*)?). It should be noted that the enclosure 60 in the present invention is not necessarily required to be formed in a shape gradually narrowed in the upward direction, but may be formed in a rectangular parallelepiped or cubic shape, as illustrated in FIG. 8(*d*). Further, in some situations, it may be formed in a shape gradually expanded in the upward direction, as illustrated in FIG. 8(*e*). That is, any shape may be employed as long as the confined air space is ensured to cover the installation position of the pump 20.

Second Embodiment

Figure 9:
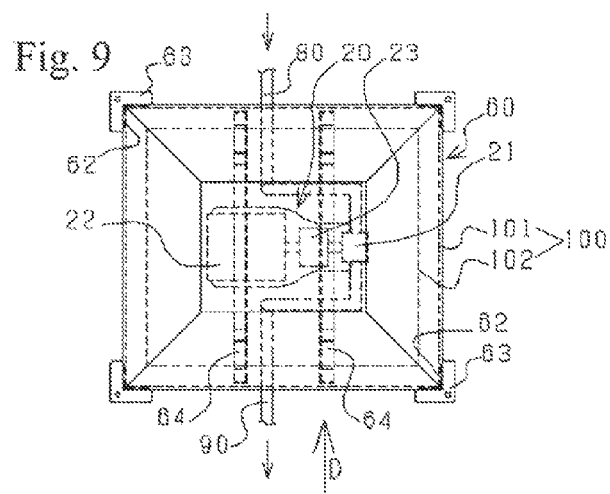
FIG. 9 is a top plan view illustrating a device submersion preventing structure according another embodiment of the present invention, wherein the device submersion preventing structure is applied to the pump in the system illustrated in FIG. 1.
Figure 10:
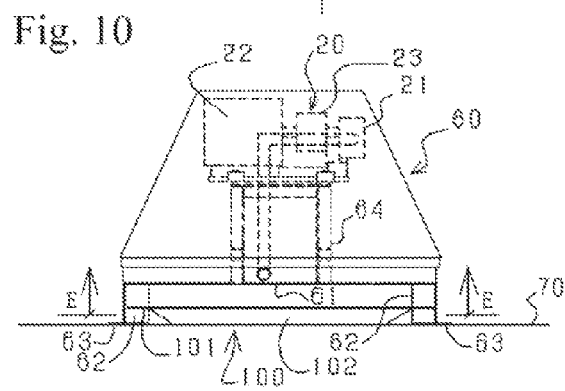
FIG. 10 is a view of the device submersion preventing structure when viewed in a direction indicated by the arrowed line D in FIG. 9.
Figure 11:
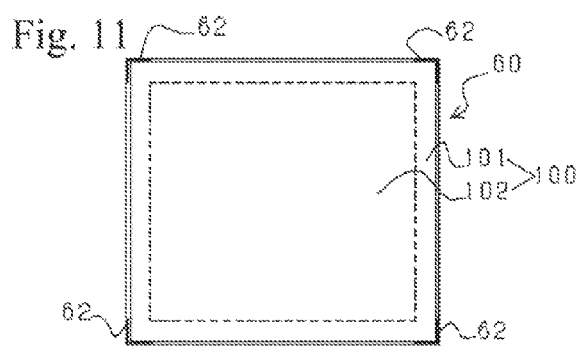
FIG. 11 is a sectional view taken along the line E-E in FIG. 10.

FIG. 9 is a top plan view illustrating a device submersion preventing structure according a second embodiment of the present invention, wherein the device submersion preventing structure is applied to the pump in the system illustrated in FIG. 1. FIG. 10 is a view of the device submersion preventing structure when viewed in a direction indicated by the arrowed line D in FIG. 9, and FIG. 11 is a sectional view taken along the line E-E in FIG. 10. In FIGS. 9 to 11, the same element or component as that in the first embodiment is assigned with the same reference sign, and its description will be omitted.

In the second embodiment, a float member 100 floatable on water is disposed beneath an opening 61 of a bottom portion of an enclosure 60 movably in an up-down direction, to serve as a blocking member configured to open and close the opening 61. The float member 100 integrally has a flange 101 provided in a peripheral edge region thereof, and a float body 102 surrounded by the flange 101 and formed in a four-sided truncated pyramid shape protruding downwardly with respect to the flange 101, wherein the flange 101 is disposed to come into contact with respective inner surfaces of four legs 62 each joined to a respective one of four corners of the bottom portion of the enclosure 60. More specifically, each of the legs 62 is formed of an equal angle steel, and the flange 101 comes into contact with respective inner surfaces of the legs 62. Thus, the float member 100 can be moved in the up-down direction while allowing the flange 101 to be guided by the inner surfaces of the legs 62.

Figure 12:
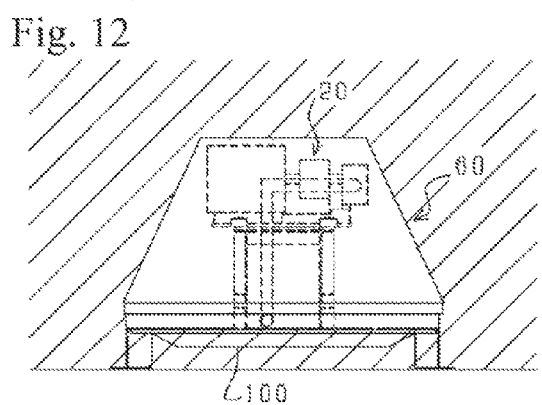
FIG. 12 is a front view of the device submersion preventing structure illustrated in FIG. 9, in a submerged state of an enclosure.

In the above device submersion preventing structure, in a normal state in which no flooding occurs, the float member 100 is moved downwardly by its own weight and located on a base 70, as illustrated in FIG. 10, so that the opening 61 of the enclosure 60 is kept in an open state. On the other hand, in the event of flooding, the float member 100 is moved upwardly by a buoyancy of water, to block up the opening 61 of the enclosure 60. Therefore, even in a situation where the enclosure 60 is submerged in water, as illustrated in FIG. 12, no water enters into the enclosure 60 to thereby prevent submergence of the pump 20. In this embodiment, the float member 100 is configured such that the float body 102 protrudes downwardly with respect to the flange 101. Thus, in the event of flooding, water can intrude beneath the flange 101 to more effectively give buoyancy thereto. When the flooding has subsided, the float member 100 is moved downwardly by its own weight to return to the initial position on the base 70. The float member 100 may be formed as a water sealing structure by attaching thereto a sealing element such as a packing, or may be formed as a simple blocking structure without attaching thereto the sealing element.

Third Embodiment

Figure 13:
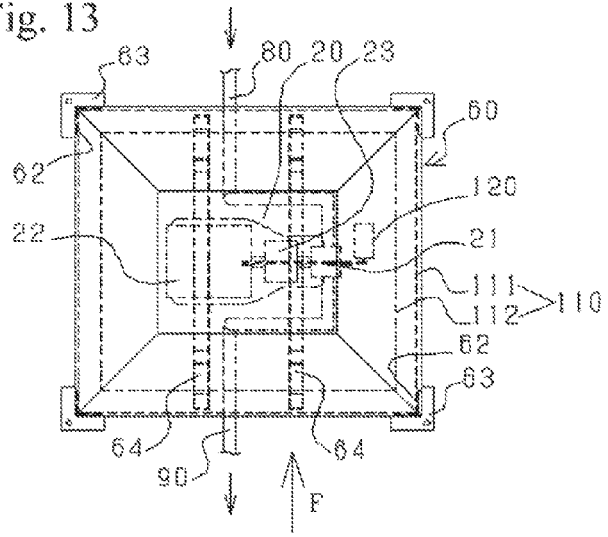
FIG. 13 is a top plan view illustrating a device submersion preventing structure according yet another embodiment of the present invention, wherein the device submersion preventing structure is applied to the pump in the system illustrated in FIG. 1.
Figure 14:
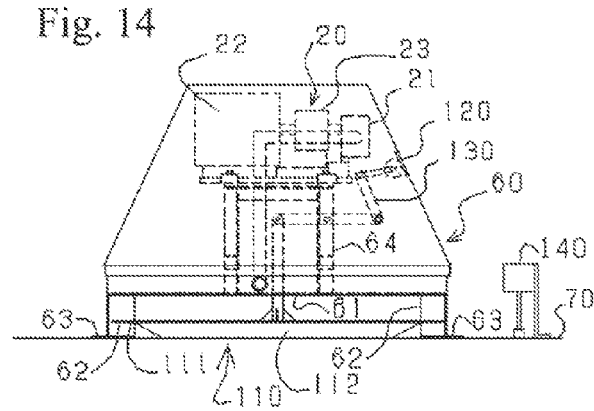
FIG. 14 is a view of the device submersion preventing structure when viewed in a direction indicated by the arrowed line F in FIG. 13.

FIG. 13 is a top plan view illustrating a device submersion preventing structure according a third embodiment of the present invention, wherein the device submersion preventing structure is applied to the pump in the system illustrated in FIG. 1. FIG. 14 is a view of the device submersion preventing structure when viewed in a direction indicated by the arrowed line F in FIG. 13. In FIGS. 13 to 14, the same element or component as that in the first and second embodiments is assigned with the same reference sign, and its description will be omitted.

In the third embodiment, a blocking member 110 is disposed beneath an opening of a bottom portion of an enclosure 60 to open and close the opening 61, wherein the blocking member 110 is configured to be moved in an up-down direction by a drive mechanism.

The blocking member 110 integrally has a flange 111 provided in a peripheral edge region thereof, and a blocking body 112 surrounded by the flange 111 and formed in a four-sided truncated pyramid shape protruding downwardly with respect to the flange 111, as with the float member 100 in the second embodiment. However, in the third embodiment, the blocking member 110 is not necessarily required to be floatable on water.

The drive mechanism for moving the blocking member 110 in the up-down direction comprises a motor 120 and a link mechanism 130. Further, a water sensor 140 for detecting the arrival of water is installed in the vicinity of the enclosure.

Figure 15:
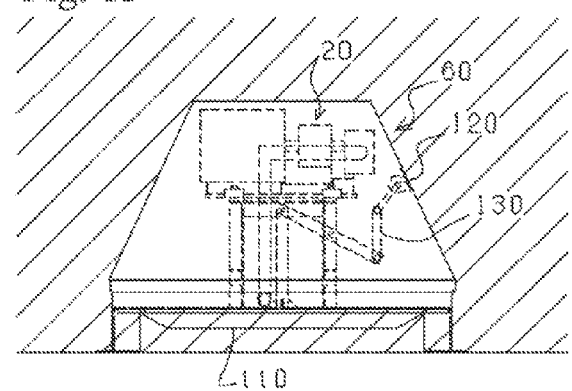
FIG. 15 is a front view of the device submersion preventing structure illustrated in FIG. 13, in a submerged state of an enclosure.

In the above device submersion preventing structure, in a normal state in which no flooding occurs, the flocking member 110 is located at an initial position on a base plate (base?) 70, so that the opening 61 of the enclosure 60 is kept in an open state. On the other hand, in the event of flooding, the water sensor detects the arrival of water, and in response to a signal indicative of the detection, the motor 120 is activated to move the blocking member 110 upwardly through the link mechanism 130 to thereby block up the opening 61 of the enclosure 61. Therefore, even in a situation where the enclosure 60 is submerged in water, as illustrated in FIG. 15, no water enters into the enclosure 60 to thereby prevent submergence of the pump 20. When the water sensor 140 becomes failing to detect water, the motor 120 returns to an initial position, and therefore the blocking member 110 also returns to the initial position on the base plate (base?) 70.

Fourth Embodiment

Figure 16:
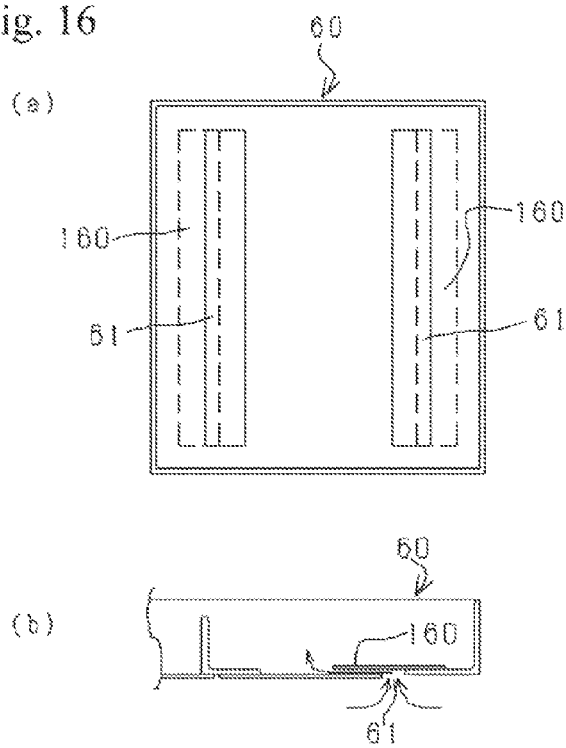

FIG. 16 illustrated a device submersion preventing structure according a fourth embodiment of the present invention, wherein the device submersion preventing structure is applied to the pump in the system illustrated in FIG. 1, and wherein FIG. 16(*a*) is a bottom view, and FIG. 16(*b*) is a fragmentary vertical sectional view.

In the fourth embodiment, a water flow resisting member 160 is disposed around an opening 61 of a bottom portion of the enclosure 60 to reduce a force of water entering from the opening 61. As illustrated in FIG. 16, the water flow resisting member 160 is disposed to cover the opening 61 from thereabove while ensuring a water flow passage.

(As illustrated in FIG. 16, the opening 61 is defined by a peripheral flange of the bottom portion of the enclosure 60, and a bottom plate having one end fixed to an L-shaped center support member disposed between opposite edges of the peripheral flange and the other end opposed to an inner edge of the peripheral flange with a given distance therebetween. The water flow resisting member 160 is disposed to cover the opening 61 from thereabove while ensuring a water flow passage with respect to the bottom plate.?) Thus, even in a situation where water enters from the opening 61 into the enclosure 60, a force of the water is reduced by the water flow resisting member 160, so that it becomes possible to allow a water level to be moderately elevated while preventing the water from violently ruffling in the enclosure 60. This makes it possible to prevent the water from being splashed over the pump.

Figure 17:
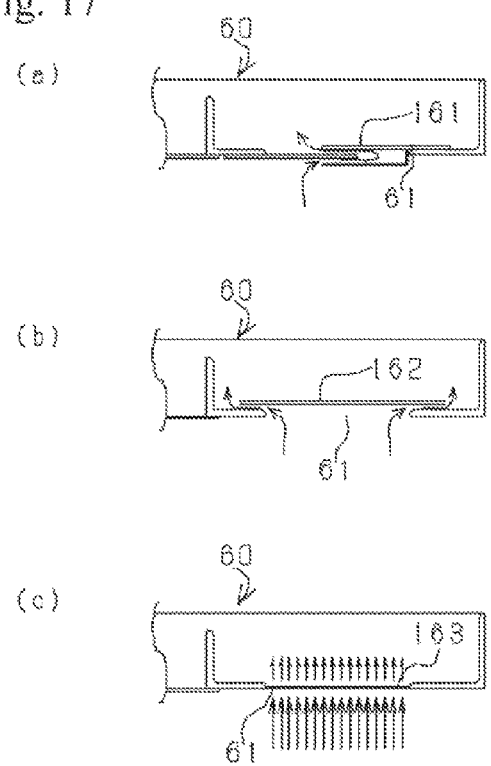
FIG. 17 illustrates various modifications of a water flow resisting member.

FIG. 17 illustrates various modifications of the water flow resisting member. In a water flow resisting member 161 illustrated in FIG. 17(a), the opening 61 is defined in the same manner as that in FIG. 16(a), and a member bent in an L shape is additionally attached to the water flow resisting member 160 illustrated in FIG. 16, to extend along an under side of the opening 61 and the bottom plate while ensuring a water flow passage with respect to the bottom plate, so as to further reduce the force of the water. A water flow resisting member 162 illustrated in FIG. 17(b) is configured to allow the water to enter from both ends of an opening 61 defined between the peripheral flange of the bottom portion of the enclosure 60 and the L-shaped center support member illustrated in FIG. 16. A water flow resisting member 163 illustrated in FIG. 17(c) is formed using a punching metal with a large number of holes.

FIG. 18 illustrates another modification of the water flow resisting member. A water flow resisting member illustrated in FIG. 18 is composed of a float member 164 floatable on water. This float member 164 has one end attached to the bottom portion of the enclosure 60 via a hinge mechanism 165, so that it is movable in a direction (approximately vertical direction) for opening and closing the opening 61 of the bottom portion of the enclosure 60. More specifically, in a normal state, the float member 164 is moved downwardly by its own weight and located at a lower position to open the opening 61. On the other hand, in the event of flooding, the float member 164 is moved by a buoyancy of water in an upwardly direction for blocking the opening 61 to thereby reduce a force of water entering from the opening 61. As a result of using the float member 164, in a normal state, the opening 61 is largely opened. This has a beneficial effect of being able to efficiently release heat from the pump and oil vapor. The float member 164 may be formed as a water sealing structure by attaching thereto a sealing element such as a packing.

Fifth Embodiment

A fifth embodiment is an example in which a structural member of a building is utilized as an enclosure in the device submersion preventing structure of the present invention.

In various examples illustrated in FIGS. 19A and 19B, the "enclosure" set forth in the appended claims is composed of a building 170, wherein an air-confining structure is formed by a portion of the building 170 other than a door section 171 and a window section 172 of a lateral wall (lateral portion) of the building 170, and a pump 20 is installed in an upper region of an internal chamber of the building 170. In the examples illustrated in FIGS. 19A and 19B, the door section 171 and the window section 172 are equivalent to the "opening" set forth in the appended claims. That is, in the examples illustrated in FIGS. 19A and 19B, the "opening" is provided only in the lateral portion of the "enclosure" at a position below an installation position of the pump 20. Even in this device submersion preventing structure, in a situation where water enters from the door section 171 and the window section 172 (opening) into the building (enclosure), a confined air space is formed in the upper region of the internal chamber of the building 170. Thus, as long as the pump 20 is located in an area corresponding to the confined air space, submersion of the pump 20 can be prevented.

Figure 20:
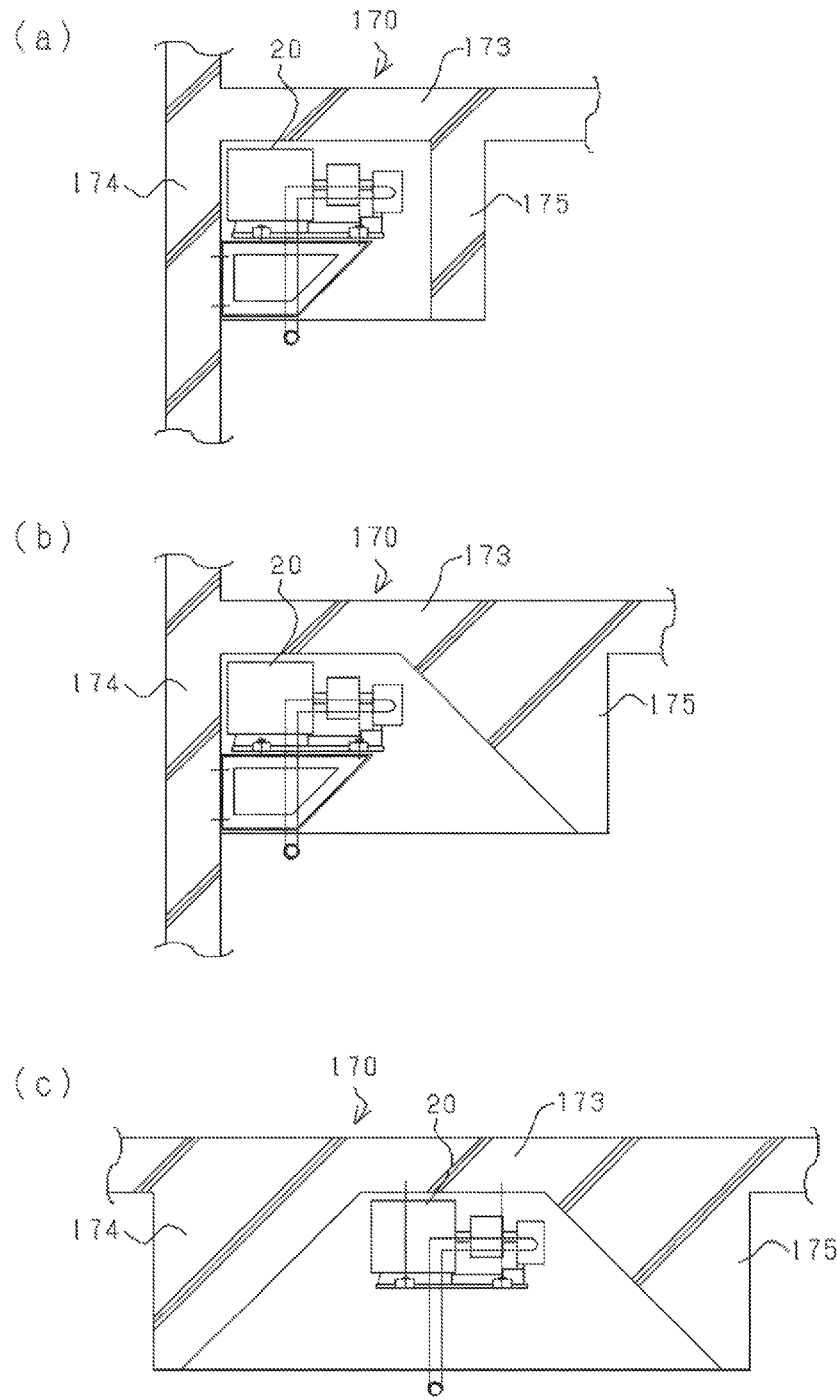
FIG. 20 illustrates examples of another modification of the device submersion preventing structure in FIG. 19A, wherein a structural member of a building is utilized as an enclosure of the device submersion preventing structure.

In various examples illustrated in FIG. 20, the "enclosure" is constructed by utilizing a wall of a building 170. More specifically, an area surrounded by an upper wall 173 and two lateral walls 174, 175 of the building 170 is utilized as the "enclosure", and a pump 20 is installed in an upper region of an internal chamber of the "enclosure". In the examples illustrated in FIG. 20, a bottom portion of the "enclosure" is opened. That is, the open bottom portion is equivalent to the "opening" set forth in the appended claims. As illustrated in FIGS. 20(b) and 20(c), the internal chamber of the "enclosure" can be formed in such a manner as to be gradually narrowed in an upward direction by utilizing a wall of a building 170.

Figure 21:
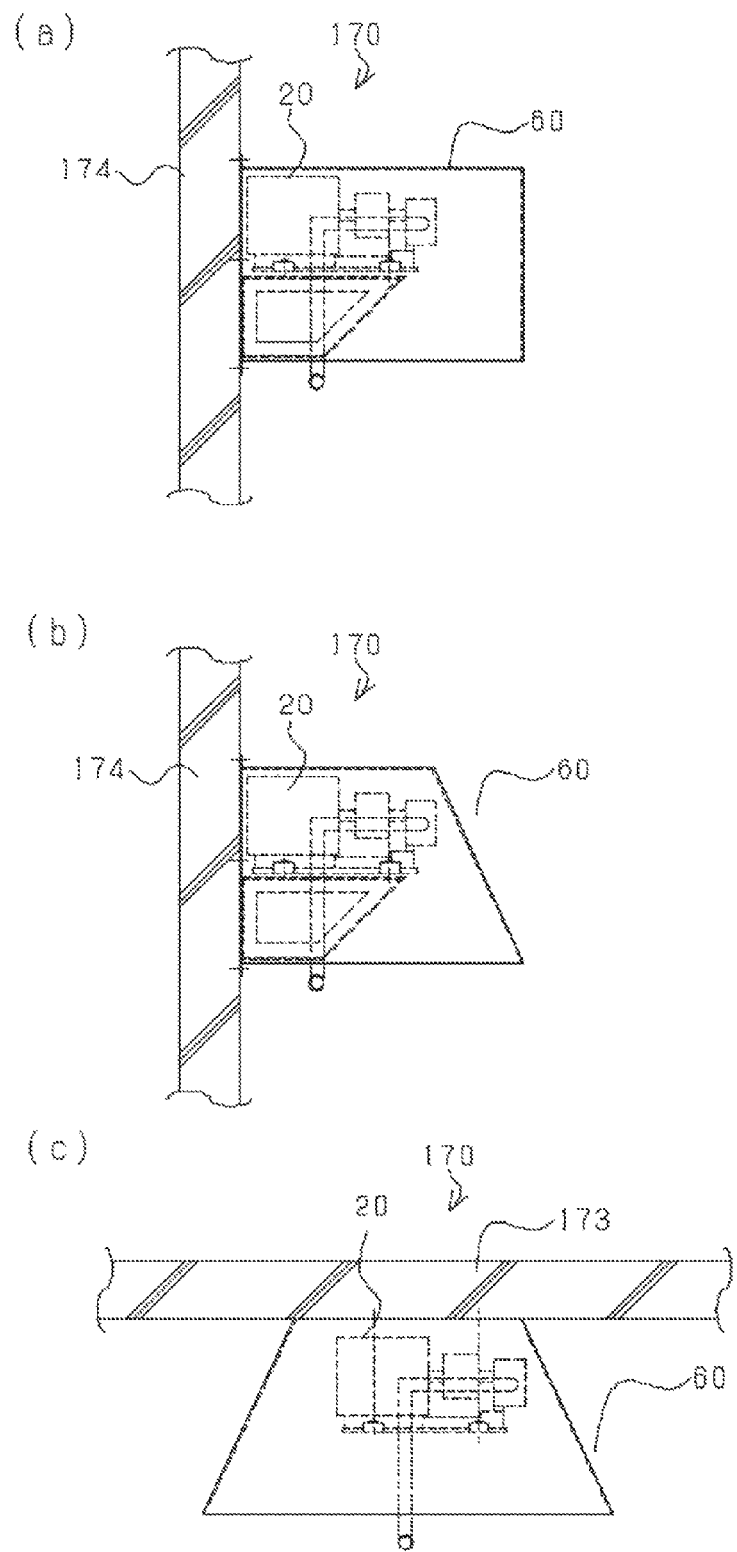
FIG. 21 illustrates examples of another modification of the device submersion preventing structure in FIG. 19A, wherein a structural member of a building is utilized as an enclosure of the device submersion preventing structure.

In various examples illustrated in FIG. 21, the "enclosure" is installed onto a wall of a building 170. This "enclosure" is formed in the same shape as one of the enclosures 60 in the aforementioned embodiments, and installed onto a lateral wall 174 or a top wall 173 of the building 170. The enclosure 60 has the "opening" only in a bottom portion thereof.

Figure 22:
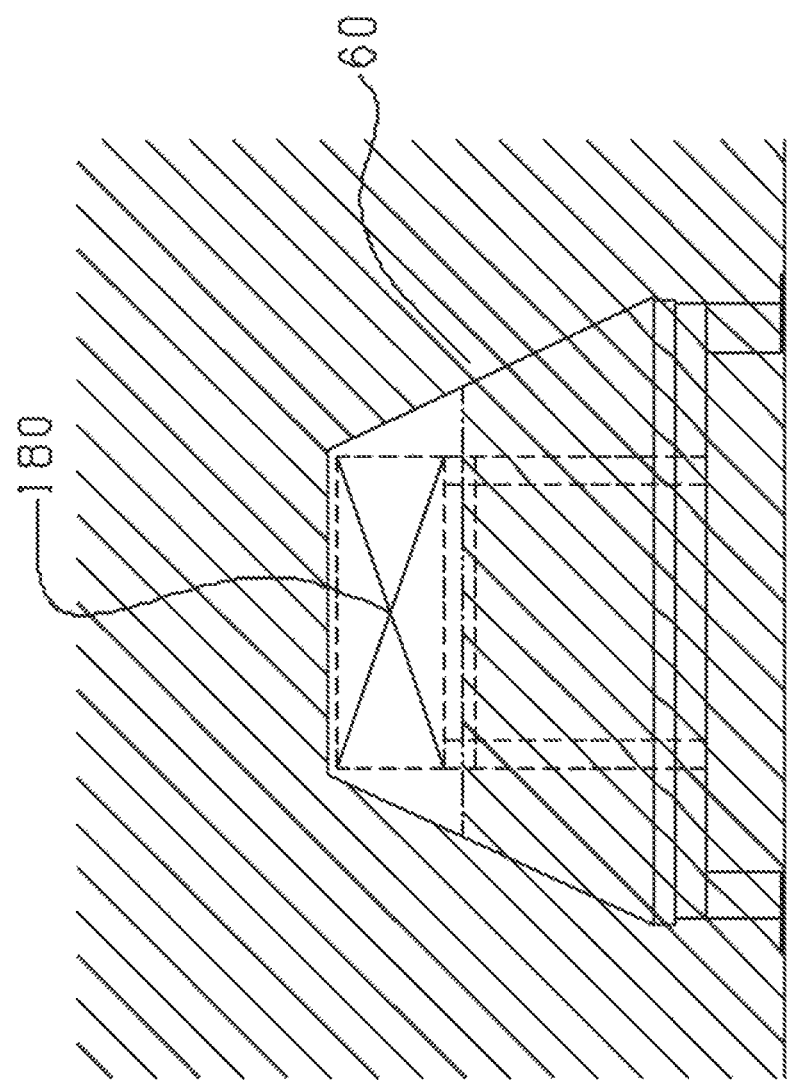
FIG. 22 illustrated a device submersion preventing structure according another further embodiment of the present invention, wherein the device submersion preventing structure is applied to a device other than a pump.

In the above embodiment, the device submersion preventing structure of the present invention is applied to an oil feed pump. However, it is to be understood that the present invention can be applied to any type of pump other than the oil feed pump. Further, the device submersion preventing structure of the present invention can be applied to any device other than a pump. For example, as illustrated in FIG. 22, any device 180, such as an electric or electronic device and its peripherals (e.g., console), a mechanical device and a nuclear-related device, may be disposed in an enclosure 60 having the same configuration as that in the first embodiment, and the present invention may be applied thereto as a submersion preventing measure.

LIST OF REFERENCE SIGNS

10: underground tank
20: pump (oil feed pump)
30: service tank
40: private power generator
50: oil barrier dam
60: enclosure
61: opening
62: leg
63: support plate
64: frame
70: base
80: suction pipe
90: discharge pipe
100: float member (blocking member)
101: flange
102: float body
110: blocking member
111: flange
112: blocking body
120: motor
130: link mechanism
140: water sensor
150: filling material
160 to 163: water flow resisting member
164: float member (water flow resisting member)

165: hinge mechanism
170: building
171: door section
172: window section
173: upper wall
174, 175: lateral wall
180: any device, such as an electric or electronic device and its peripherals (e.g., console), a mechanical device and a nuclear-related device

The invention claimed is:

1. A device submersion preventing structure comprising an enclosure having an internal chamber for installing a device therein, wherein the enclosure is configured such that an opening is provided only in a bottom portion thereof, or only in a lateral portion thereof at a position below an installation position of the device, and a remaining portion thereof is formed as an air-confining structure, wherein the enclosure is formed such that a region of the internal chamber thereof where the device is installed is gradually narrowed in an upward direction, wherein the device is an oil feed pump, which further comprises a blocking member disposed beneath the opening of the enclosure movably in an up-down direction, the blocking member being configured such that, in a normal state, it is disposed to open the opening of the enclosure, and, in the event of flooding, moved upwardly to block up the opening of the enclosure.

2. The device submersion preventing structure as defined in claim 1, wherein the blocking member is composed of a float member floatable on water, the float member being configured such that, in a normal state, it is disposed to open the opening of the enclosure, and, in the event of flooding, moved upwardly by a buoyancy of water to block up the opening of the enclosure.

3. A device submersion preventing structure comprising an enclosure having an internal chamber for installing a device therein, wherein the enclosure is configured such that an opening is provided only in a bottom portion thereof, or only in a lateral portion thereof at a position below an installation position of the device, and a remaining portion thereof is formed as an air-confining structure, wherein the enclosure is formed such that a region of the internal chamber thereof where the device is installed is gradually narrowed in an upward direction, wherein the device is an oil feed pump, which further comprises a water flow resisting member disposed around the opening to reduce a force of water entering from the opening.

4. The device submersion preventing structure as defined in claim 3, wherein the water flow resisting member is disposed around the opening of the bottom portion of the enclosure, and wherein the water flow resisting member is composed of a float member floatable on water, the float member being configured such that, in a normal state, it is disposed to open the opening of the bottom portion, and, in the event of flooding, moved by a buoyancy of water in an upward direction for blocking the opening of the bottom portion to thereby reduce a force of water entering from the opening.

* * * * *